United States Patent
Foshage et al.

(10) Patent No.: US 9,605,736 B1
(45) Date of Patent: Mar. 28, 2017

(54) HIGH TEMPERATURE ELECTROMAGNETIC ACTUATOR

(71) Applicant: RCT Systems, Inc., Linthicum Hts, MD (US)

(72) Inventors: Gerald K. Foshage, Boxford, MA (US); Mark Bryant, Glen Burnie, MD (US)

(73) Assignee: RCT Systems, Inc., Linthicum Hts, MD (US)

(*) Notice: Subject to any disclaimer, the term of this patent is extended or adjusted under 35 U.S.C. 154(b) by 305 days.

(21) Appl. No.: 14/294,003

(22) Filed: Jun. 2, 2014

Related U.S. Application Data

(60) Provisional application No. 61/829,554, filed on May 31, 2013.

(51) Int. Cl.
 *F02K 1/76* (2006.01)
 *F16H 37/08* (2006.01)
 *F16H 25/22* (2006.01)
 *F16H 25/20* (2006.01)

(52) U.S. Cl.
 CPC .......... *F16H 25/2252* (2013.01); *F02K 1/76* (2013.01); *F02K 1/763* (2013.01); *F16H 37/0826* (2013.01); *F16H 2025/2062* (2013.01)

(58) Field of Classification Search
 CPC ........ F16H 25/2252; F16H 25/20; F16H 1/06; F16H 2025/204; F16H 2025/2062; F16H 2025/2081; F16H 2025/2087; F16H 2025/2053; F16H 37/0826; F02K 1/002; F02K 1/004; F02K 1/006; F02K 1/008; F02K 1/04; F02K 1/06; F02K 1/08; F02K 1/085; F02K 1/09; F02K 1/10; F02K 1/11; F02K 1/12; F02K 1/1207; F02K 1/1215; F02K 1/1223; F02K 1/123; F02K 1/1238; F02K 1/1246
 See application file for complete search history.

(56) References Cited

U.S. PATENT DOCUMENTS 3,911,673 A * 10/1975 Roginson ................ F02K 1/002
  244/23 B
2012/0234117 A1* 9/2012 Oswald ............... E21B 41/0007
  74/89.39

* cited by examiner

*Primary Examiner* — Gerald L Sung
*Assistant Examiner* — William Breazeal
(74) *Attorney, Agent, or Firm* — Miles & Stockbridge PC

(57) ABSTRACT

An electromagnetic actuator is provided. The electromagnetic actuator includes a planetary roller screw and at least two motor assemblies disposed on opposing sides of the roller screw. The planetary roller screw includes a shaft linearly translatable between an extended position and a retracted position, a nut rotatable about the shaft, and a plurality of rollers coupling the nut to the shaft. A spur gear is fixedly connected to the nut. Each motor assembly includes a DC motor having an output shaft, a planetary gear head coupled to the DC motor output shaft and having an output shaft, and a pinion gear coupled to the spur gear and fixedly connected to the planetary gear head output shaft.

20 Claims, 5 Drawing Sheets

HIGH TEMPERATURE ELECTROMAGNETIC ACTUATOR

CROSS-REFERENCE TO RELATED APPLICATIONS

This application is a nonprovisional patent application that claims the benefit of U.S. Patent Application Ser. No. 61/829,554, filed on May 31, 2014, the disclosure of which is incorporated herein by reference in its entirety.

TECHNICAL FIELD

The present invention relates to an actuator. More particularly, the present invention relates to an electromagnetic actuator.

BACKGROUND

Jet engines require actuators for certain engine subsystem components, such as, for example, variable compressor stator vanes, variable geometry nozzles, thrust vectoring nozzles, thrust reversers, etc. Actuators that are used in the hot section of the jet engine, i.e., from the combustion chamber rearward to the nozzle, must operate in a high temperature environment and typically require cooling to perform effectively. For example, when hydraulic actuators are used to control the geometry of the nozzle, the hydraulic fluid must be cooled in order to ensure the proper operation of the hydraulic actuator. While nozzle actuation typically has a low duty cycle, the heat absorbed to keep components cool is continuous and presents a significant load on the aircraft/engine thermal management system, particularly when jet fuel is used as the hydraulic working fluid, as in fueldraulic systems.

SUMMARY

Embodiments of the present invention advantageously provide an electromagnetic actuator including a planetary roller screw and at least two motor assemblies disposed on opposing sides of the roller screw. The planetary roller screw includes a shaft linearly translatable between an extended position and a retracted position, a nut rotatable about the shaft, and a plurality of rollers coupling the nut to the shaft. A spur gear is fixedly connected to the nut. Each motor assembly includes a DC motor having an output shaft, a planetary gear head coupled to the DC motor output shaft and having an output shaft, and a pinion gear coupled to the spur gear and fixedly connected to the planetary gear head output shaft.

There has thus been outlined, rather broadly, certain embodiments of the invention in order that the detailed description thereof herein may be better understood, and in order that the present contribution to the art may be better appreciated.

Before explaining at least one embodiment of the invention in detail below, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
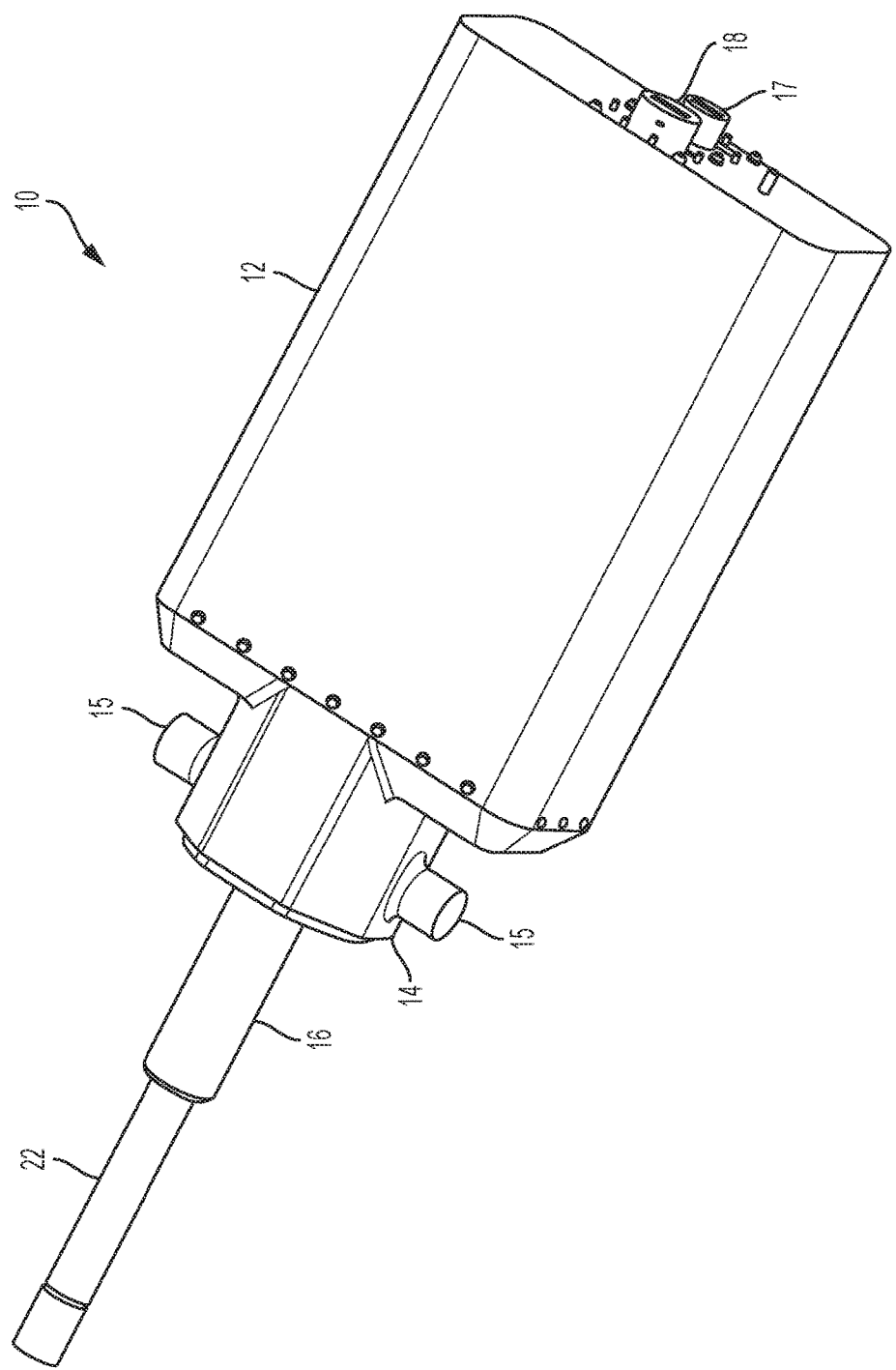
FIG. 1 presents a perspective view of an electromagnetic actuator, in accordance with an embodiment of the present invention.

The present invention will now be described with reference to the drawing figures, in which like reference numerals refer to like parts throughout.

Embodiments of the present invention advantageously provide an electrically driven mechanical actuator that reduces the heat load of an aircraft by eliminating or reducing the cooling requirements not possible with existing, highly intertwined engine fueldraulic actuators and aircraft fuel systems. Elimination of the fueldraulic actuator heat load advantageously reduces thermal management system requirements.

Figure 2:
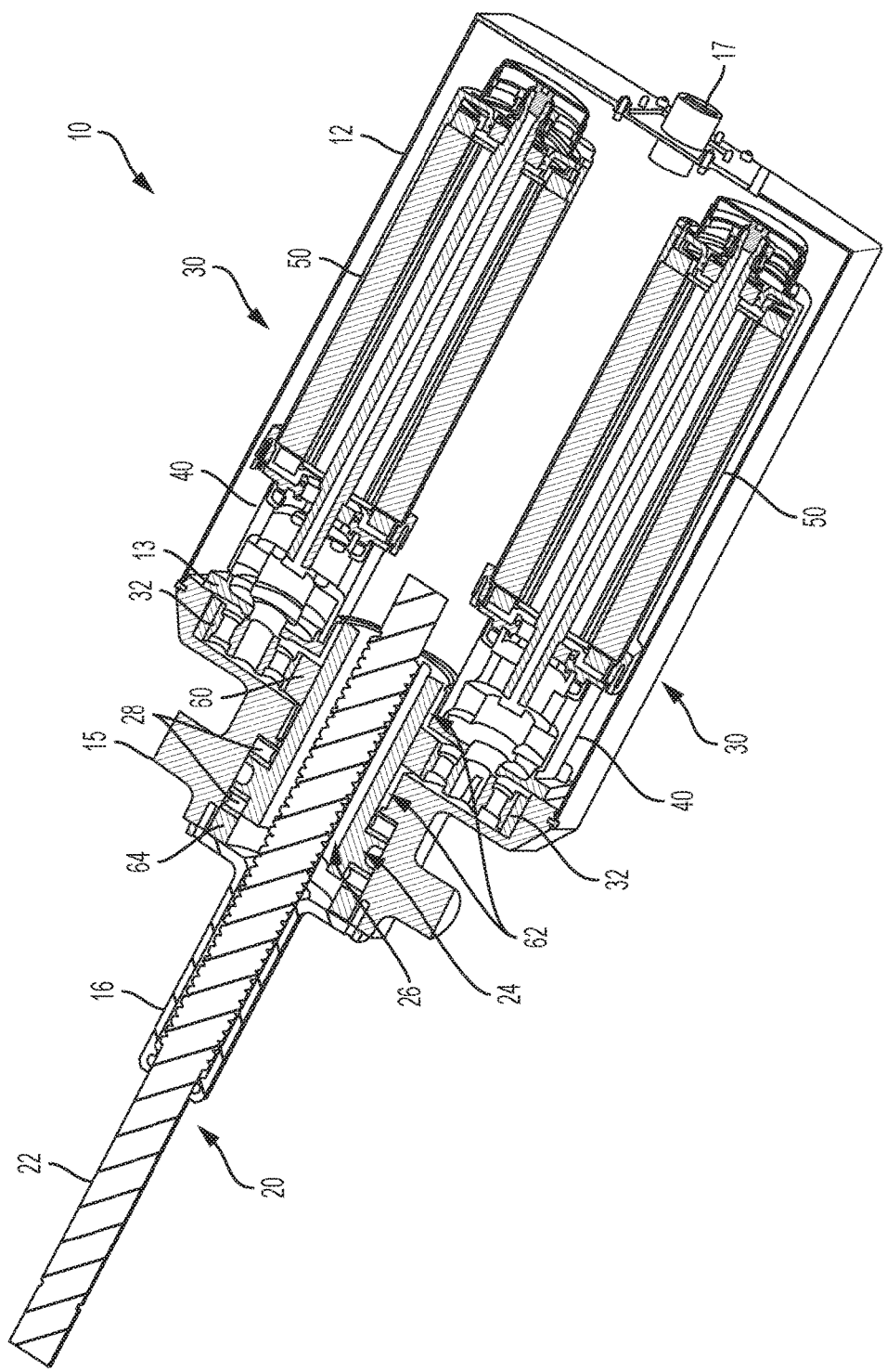
FIG. 2 presents a sectional view along a longitudinal axis of the electromagnetic actuator depicted in FIG. 1.

FIG. 1 presents a perspective view of an electromagnetic actuator 10, in accordance with an embodiment of the present invention, while FIG. 2 presents a sectional view along the longitudinal axis of the electromagnetic actuator 10 depicted in FIG. 1.

In one embodiment, electromagnetic actuator 10 includes a planetary roller screw 20 coupled to a pair of motor assemblies 30 disposed on opposing sides of the planetary roller screw 20. This arrangement advantageously balances radial gear loads. The motor assemblies 30 are mechanically connected to the planetary roller screw 20 in parallel. A rear housing 12 encloses the motor assemblies 30, and a front cover 14, connected to the rear housing 12, has a pair of opposing trunions 15 for mounting to respective pivoting points or bearing surfaces. A planetary roller screw shaft enclosure 16 is connected to the front cover 14, and may include one or more seals to prevent debris, contaminants, etc., from entering the electromagnetic actuator 10. Signal connector 17 and power connector 18 are provided on an end of the rear housing 12.

Electromagnetic actuator 10 may accommodate a wide range of transient loads, e.g., 500 $lb_f$, 2,000 $lb_f$, 10,000 $lb_f$, etc., a wide range of holding loads, e.g., 2,000 $lb_f$, 10,000 $lb_f$, etc., slew rates, e.g., 100 deg/sec, 300 deg/sec, etc. For example, the power draw for static holding of 10,000 $lb_f$ may range between 0.74 and 1.38 kW depending on motor selection.

In alternative embodiments, more than two motor assemblies 30 may be disposed symmetrically around the planetary roller screw 20, such as, for example, three motor assemblies 30, four motor assemblies 30, etc.

The planetary roller screw 20 includes a shaft 22, linearly translatable between an extended position and a retracted position, and a nut 24 that is coupled to the shaft 22 via a plurality of rollers 26 arranged around the shaft 22. The shaft 22 includes screw threads extending from a proximal end towards a distal end, which has a mechanical interface for connection to a component to be actuated, such as, for example, threads, keyways, splines, mechanical fasteners, slots, etc. Each roller 26 includes screw threads that extend along a central shaft, and a planetary gear at each end of the central shaft. The rollers 26 are attached to a carrier (not shown for clarity) and rotate freely with respect thereto. The nut 24 includes two ring gears (not shown for clarity) disposed at each end, which mesh with the planetary gears of the rollers 26. The screw threads of the rollers 26 mesh with the screw thread of the shaft 22, such that when the nut 24 is rotated, the ring gear of the nut 24 causes the planetary gears of the rollers 26 to rotate, which causes the shaft 22 to translate linearly due to the interaction of the screw threads of the rollers 26 and the screw thread of the shaft 22. The carrier also rotates about the shaft 22, typically at a slower rotation rate than the nut 24.

In one embodiment, the planetary roller screw 20 provides 10 mm/revolution, and has a stroke of 4 inches. Other screw pitches and strokes are also contemplated by the present invention, such as, for example, a stroke of 3 inches, 6 inches, etc. In an alternative embodiment, a ball screw may be used in place of the planetary roller screw 20.

Each motor assembly 30 includes a pinion gear 32, a planetary gear head 40 and a motor 50. The pinion gear 32 is connected to the output shaft 45 of the planetary gear head 40 using, for example, threads, key slots, splines, mechanical fasteners, etc. The output shaft 55 of the motor 50 is connected to a sun gear (not shown for clarity) that meshes with the planetary gears 43 of the planetary gear head 40, which are rotatably attached to a carrier 48 with the output shaft 45. A spur gear 60 is connected to the nut 24 of the planetary roller screw 20 using, for example, key slots, splines, mechanical fasteners, etc., and meshes with the pinion gears 32 of the motor assemblies 30. Activation of the motors 50 causes the pinion gears 32 to rotate, which cause the spur gear 60 and nut 24 to rotate, which cause the shaft 22 to linearly translate. Extension and retraction of the shaft 22 is accomplished by activating the motors 50 in one direction or the other. In one embodiment, the motors 50 are wired in series by phase, while in another embodiment, the motors 50 are wired in parallel. A controller may be electrically connected to the signal connector 17 and the power connector 18.

A bulkhead 13 is connected to the rear housing 12 and planetary gear head 50 of each motor assembly 30, and includes a needle bearing 62 coupled to the nut 24 of the planetary roller screw 20. The front cover 14 may also include a needle bearing 62 coupled to the nut 24 of the planetary roller screw 20, as well as a pair of thrust bearings 28 coupled to the nut 24. A threaded pre-loaded retaining nut 64 locks the nut 24 in place. In one embodiment, the gear ratio between the spur gear 60 and the two pinion gears 32 is approximately 1.4:1; other ratios are also contemplated.

Figure 3:
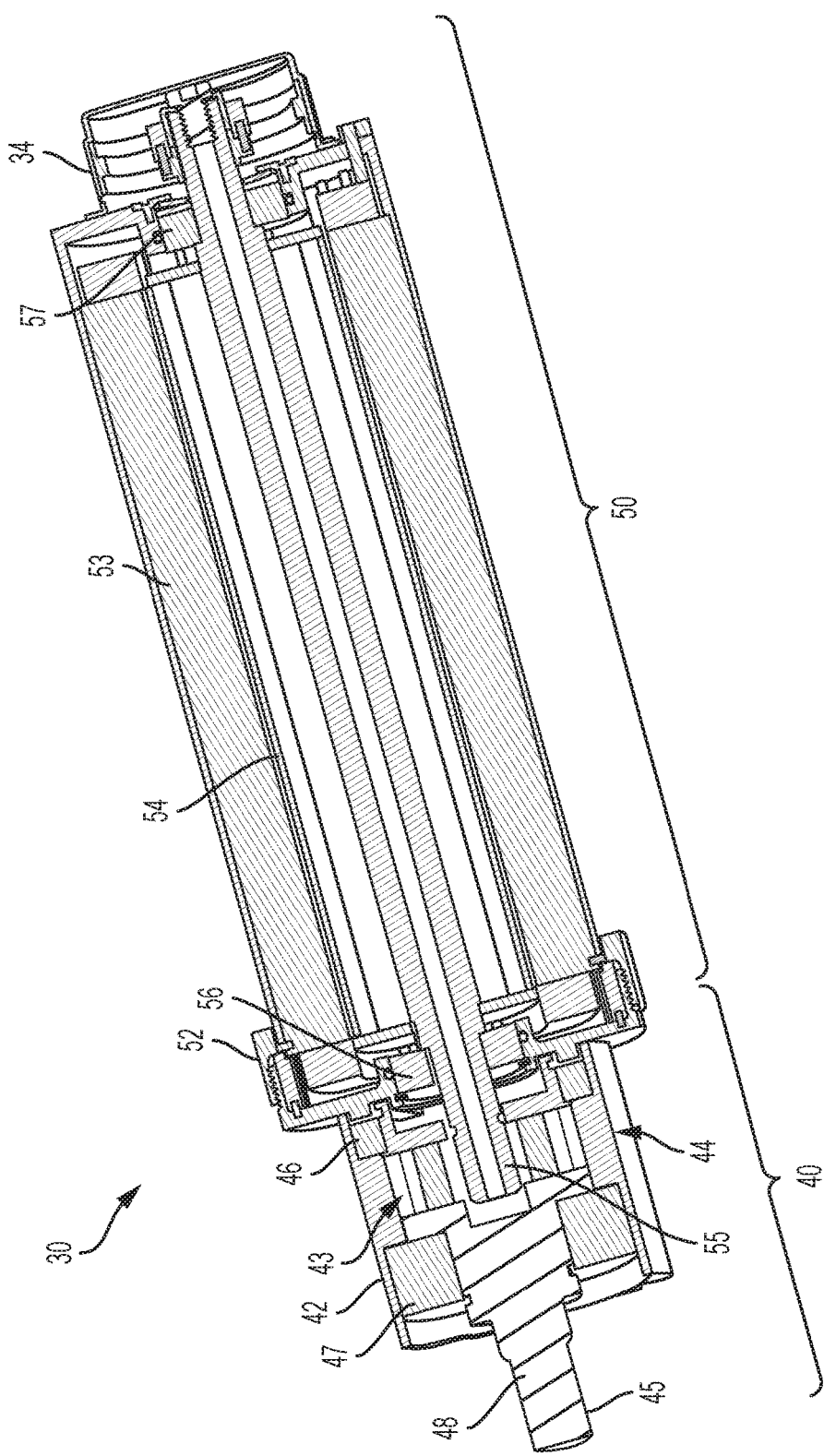
FIG. 3 presents a sectional view along a longitudinal axis of a motor assembly, in accordance with an embodiment of the present invention.

FIG. 3 presents a sectional view along a longitudinal axis of a motor assembly 30, in accordance with an embodiment of the present invention.

Planetary gear head 40 includes a housing 42, a central or sun gear (not shown for clarity), a plurality of planetary gears 43, a ring gear 44 that meshes with the planetary gears 43, a carrier 48 with an output shaft 45, and bearings 46 and 47. The planetary gears 43 are attached to the carrier 48, and rotate freely with respect thereto. In one embodiment, the planetary gear head 40 provides a 5:1 gear ratio; other gear ratios are also contemplated. Magnetic planetary gearing may also be used, requires no lubrication and does not jamb. Magnetic planetary gears have comparable power transmission density as mechanical planetary gears. In other embodiments, cycloid gearing and flex spline or harmonic drives may be used.

The motor 50 includes a housing 52, a stator 53, a rotor 54, an output shaft 55 and bearings 56 and 57. In one embodiment, motor 50 includes a brake (not shown for clarity). A rotary position sensor 34, such as a resolver, encoder, synchro, etc., may be attached to the proximal end of the output shaft 55, and one or more temperature sensors (not shown for clarity) may also be installed within the rear housing 12, on or within the motor assemblies 30, etc. In one embodiment, the rotary position sensor 34 is an eight speed resolver with four cycles per revolution. In another embodiment, a linear position sensor, such as, for example, a linear variable differential transformer (LVDT), may be used to measure the translation of the shaft 22 of the planetary roller screw 20, in place of, or in addition to, the rotary position sensor 34. The signal connector 17 may include lines for each rotary position sensor 34, such as excitation and sensing lines for a resolver, temperature sensor lines, etc. The power connector 18 includes power lines for the motors 50.

Magnetic field sensors such as Hall Effect, Magneto Resistive or similar sensors and permanent magnets may be used for discrete commutation. Alternatively, motor drive techniques that do not require sensor feedback may be used.

In one embodiment, the rotary position sensor 34 is a multi-speed, variable reluctance resolver with all windings on the stator. A single speed and a multi-speed resolver may also be used to determine absolute position. In another embodiment, multi-speed resolver data and linear position sensor data may be combined to obtain absolute rotary or linear position information. Velocity and or acceleration may be derived from these sensors as well for control purposes.

In one embodiment, the motor 50 is a DC brushless permanent magnet (PM) motor, which advantageously minimizes weight and power while providing excellent efficiency with high bandwidth for servo applications. Brushless commutation is appropriate for life, reliability and maintenance issues. High motor pole count also contributes to minimizing weight; one embodiment has 8 poles, for example. The PM motor design includes a mechanical containment band and end plates to contain the surface mount PMs. Buried magnets in rotor laminations may be used in some embodiments. A PM machine with saliency may also be used with direct and quadrature (DQ) control methods.

The DC brushless PM motors may use high temperature samarium cobalt (SmCo) magnets. Simple magnet geometry and a robust rotor packaging, with the totally enclosed magnets provides a robust rotor design. The magnets operate with a steep load line or high magnetic flux density (B), keeping their operating point well away from the knee of the demagnetization curve. With sufficient thermal margin, lower weights can be realized than with a variable reluctance (VR) machine.

The stators 53 may employ a high temperature insulation system. Several different high temperature insulation systems may be incorporated, including mica based system capable of >900° F. (>482° C.) along with other insulation systems. One embodiment includes anodized aluminum wire with discrete Nomex insulation with or without a silicone potting. Hard anodized aluminum (Al) offers a good protective ceramic coating ($AlO_2$) which functions well at high temperatures. While the initial resistivity of copper is lower than aluminum, after some operating time at elevated temperatures diffusion and/or oxidation of the copper increases the resistivity such that Al is no longer at a disadvantage and the benefits of Al's lower density becomes desirable. Of course copper has a higher melting point enabling higher steady state temperatures but Al has higher heat capacity (Cp) enabling adequate heat storage during power transients. Al wire with oxide coating with discrete Nomex insulating paper may be used for slot and phase insulation and silicone potting. Anodized Al can be used for the conductors & bus bars in the power electronics as well. Other options include Silver and carbon nano tube conductors. Windings may be fabricated from single strand or multiple strands. Round or ribbon conductor geometries may be used.

For jet engine applications, high saturation flux density lamination material may be desirable. Iron Cobalt Alloys, such as Hiperco 50 Alloy stator lamination material, is an option, based on its high saturation flux density (Bsat), high temperature stability and well characterized temperature properties. Alternative materials include Iron, Nickel Iron and Silicon Iron alloys.

In other embodiments, the motor 50 may be a wound rotor DC (brush and brushless), induction and variable or switched reluctance (VR or SR) machines. Brushless DC PM and SR machines may also be used. These motors may use sensor-less commutation methods or a VR resolver can be incorporated in the design if required for control feedback among other options. VR machines do not require containment but have quite small mechanical gaps that must be maintained over temperature and life, and must contend with negative radial de-centering forces. Both machines can be back driven, and a VR machine has no back electro-motive force (BEMF) when not energized while being back driven.

In certain embodiments, the motor assembly 30 includes a lock, clutch and/or brake mechanism. For example, a power on, lock on, attractive cup core electromagnetic actuator may be used in combination with a pair of tooth disks and a preload spring configured for a jamb free failure mode. The electromagnet pulls a tooth disk on the rotor into engagement with a stationary toothed disk and has a low holding power requirement. When the current is turned off, the spring disengages the plates allowing for rotary motion. The toothed plates may be located at the planetary roller screw nut 24, the pinion gears 32 or the motor rotors 54, using the mechanical advantage to minimize the holding torque requirements.

Figure 4:
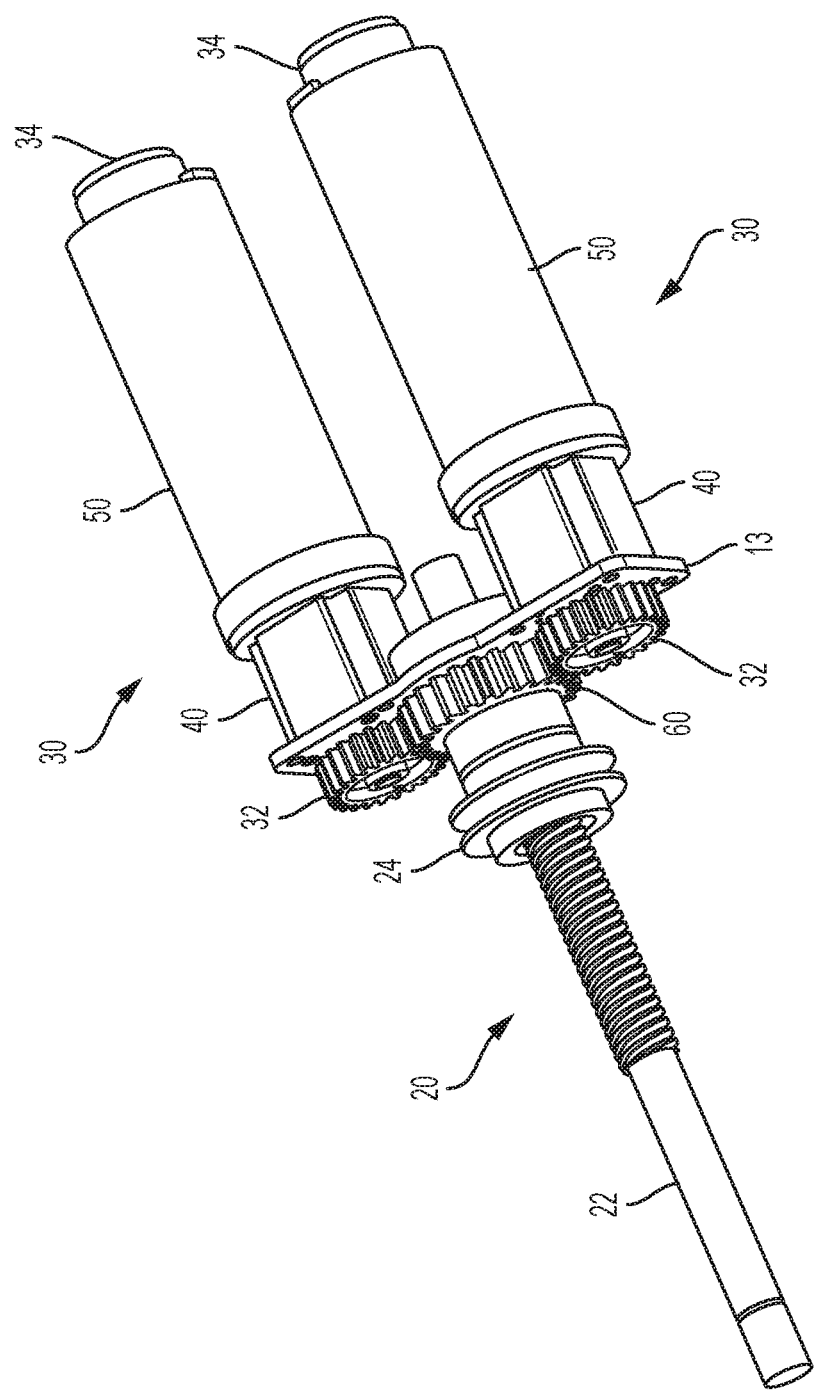
FIG. 4 presents a perspective view of the main components of an electromagnetic actuator in an extended position, in accordance with an embodiment of the present invention.
Figure 5:
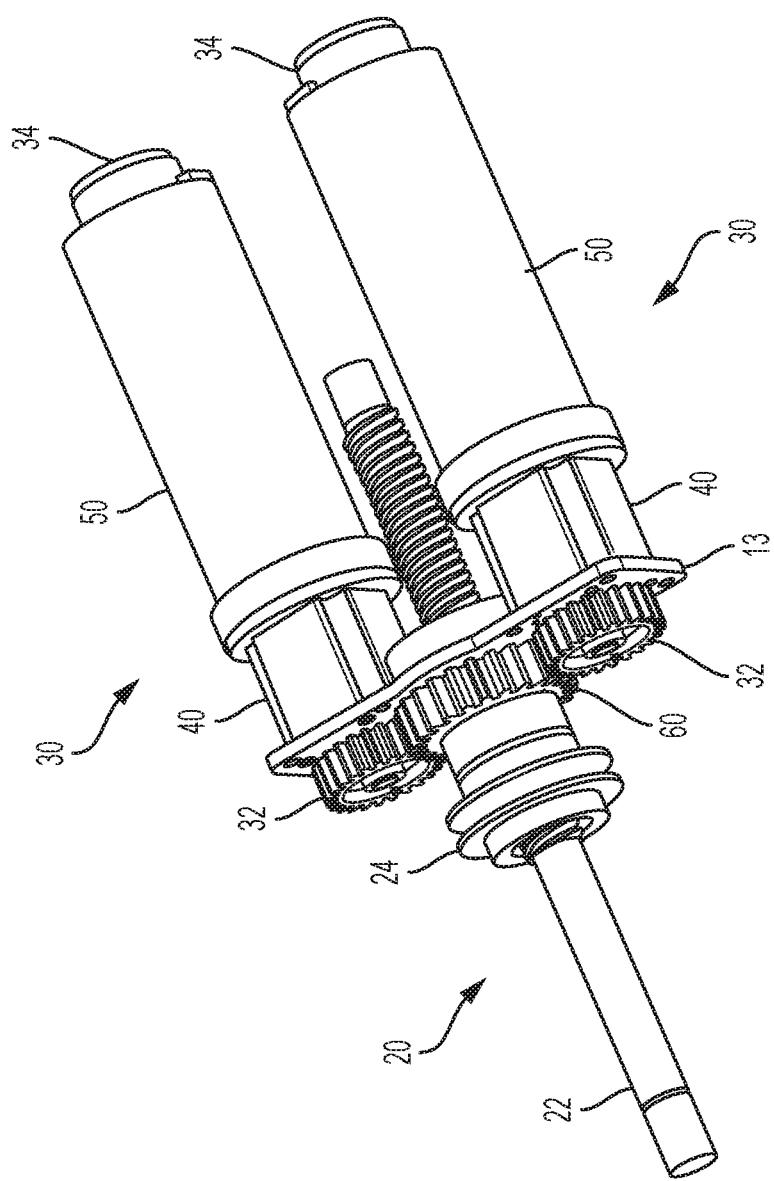
FIG. 5 presents a perspective view of the main components of an electromagnetic actuator in a retracted position, in accordance with an embodiment of the present invention.

FIG. 4 presents a perspective view of the main components of an electro magnetic actuator 10 in an extended position, while FIG. 5 presents a perspective view of the main components of an electro magnetic actuator 10 in a retracted position, in accordance with an embodiment of the present invention.

In one embodiment, power electronics in electromagnetic actuator 10 may be integrated with a remotely located master control electronics module. A Silicon Carbide (SiC) motor drive may be used. One embodiment includes a three phase motor 50 that has relatively simple power electronics with three half bridges, respective phases of each motor 50 may be wired together such that the motors 50 are wired in series by phase. A separate power-on brake function may be provided by a fourth half bridge.

In one embodiment, SiC based power modules and Silicon on Insulator (SOI) based gate drive circuits may be located within the rear housing 12. The power modules may be configured as a three phase bridge packaged in three dual junction field effect transistor (JFET) modules. Each of the two switch locations in a module consists of eight 100 mOhm normally off JFET SiC die and one 30 Amp SiC diode. The maximum rated junction temperature of these devices as installed in the module is 250° C. At an ambient temperature of 163° C. (325° F.) the junction temperature of the JFETs should be less than 200° C. Brief (10 second) increases in ambient temperature will not appreciably raise the junction temperature because of the thermal mass of electromagnetic actuator 10 and drive modules. At these temperatures the module supports a current of 75 Amps per switch and still have a low drain-source on-resistance (RDS (on)). Each actuator motor 50 may draw about 50 Amps peak per phase at maximum torque when operated from 270 VDC power. A line of high temperature semiconductors may be used to build up the gate drives needed to control the JFET modules. These devices are of SOI construction and are rated for use from −55° C. to +225° C. The gate drive board may be co-located with the power module inside the actuator housing. These components, when operated at 225° C., have the reliability and life of standard silicon semiconductors and substantially increase the reliability and life of the system when operated at lower temperatures. High temperature circuit board material may be used to mount the semiconductors and passive components.

With respect to cooling in a high temperature environment, air flow with a convection coefficient of >5 W/m2° C. at the electromagnetic actuator 10 may be provided to keep the internal motor temperature at 30 C delta above ambient, while slewing at full load. Similarly, a 25 C delta at stall & full load may exist at the same conditions. For 20% load at stall a delta of 2 C is estimated.

In one embodiment for jet engine variable nozzle geometry control, five electromagnetic actuators 10 may be configured to work in parallel. Each electromagnetic actuator 10 produces 1.25 times the rated output force in the event one unit is inoperable. An appropriate system controller may be provided, in addition to, or in place of, the individual master control electronics modules.

In accordance with embodiments of the present invention, an electromagnetic actuator 10 includes a planetary roller screw 20 coupled to at least two motor assemblies 30 disposed on opposing sides of the planetary roller screw 20. The motor assemblies 30 are mechanically connected to the planetary roller screw 20 in parallel, and electrically connected to one another in series by phase. Each motor assembly 30 includes a pinion gear 32, a planetary gear head 40 and a motor 50. A sun gear 60, connected to the nut 24 of the planetary roller screw 20, meshes with the pinion gears 32 of the motor assemblies 30, such that when the motors 50 are activated the shaft 22 of the planetary roller screw 20 translates linearly between extended and retracted positions.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An electromagnetic actuator for controlling a geometry of a jet engine nozzle, comprising:
   a planetary roller screw, including:
   a planetary roller screw shaft, linearly translatable between an extended position and a retracted position, connected to the jet engine nozzle,
   a nut, rotatable about the planetary roller screw shaft, and
   a plurality of rollers coupling the nut to the planetary roller screw shaft;
   a spur gear fixedly connected to the nut; and
   at least two motor assemblies, disposed on opposing sides of the planetary roller screw, coupled to the nut, each motor assembly including:
   a DC motor having an DC motor output shaft,
   a planetary gear head, coupled to the DC motor output shaft, having a planetary gear head output shaft, and
   a pinion gear, coupled to the spur gear, fixedly connected to the planetary gear head output shaft, and
   an electromagnetic actuator housing including a pair of trunions, disposed on opposing sides of the planetary roller screw, connected to respective bearings disposed on a jet engine body.

2. The electromagnetic actuator according to claim 1, wherein the electromagnetic actuator housing includes:
   a rear housing enclosing the at least two motor assemblies;
   a bulkhead, connected to the rear housing and the planetary gear head of each motor assembly, including at least one bearing coupled to the nut;
   a front cover, connected to the rear housing, including the pair of trunions disposed on opposing sides of the planetary roller screw and a pair of thrust bearings coupled to the nut; and
   a planetary roller screw shaft enclosure, connected to the front cover, enclosing a portion of the planetary roller screw shaft.

3. The electromagnetic actuator according to claim 1, wherein each motor assembly includes a rotary position sensor coupled to the DC motor output shaft.

4. The electromagnetic actuator according to claim 3, wherein the rotary position sensor is an eight speed resolver with four cycles per revolution.

5. The electromagnetic actuator according to claim 1, wherein each motor assembly includes a linear position sensor coupled to the planetary roller screw shaft.

6. The electromagnetic actuator according to claim 5, wherein the linear position sensor is a linear variable differential transformer.

7. The electromagnetic actuator according to claim 1, wherein each motor assembly includes a brake.

8. The electromagnetic actuator according to claim 1, wherein the DC motors are three phase brushless permanent magnet motors wired together in series by phase.

9. The electromagnetic actuator according to claim 8, wherein the DC motors include Samarium Cobalt magnets.

10. The electromagnetic actuator according to claim 9, wherein the DC motors include insulated stators.

11. The electromagnetic actuator according to claim 1, wherein the at least two motor assemblies comprise at least three motor assemblies symmetrically disposed around the planetary roller screw.

12. The electromagnetic actuator according to claim 2, wherein the planetary roller screw shaft enclosure includes at least one seal.

13. The electromagnetic actuator according to claim 1, wherein a gear ratio between the spur gear and the pinion gears is 1.4:1, and a gear ratio for the planetary gear head is 5:1.

14. An electromagnetic actuator for controlling a geometry of a jet engine nozzle, comprising:
    a planetary roller screw, including:
    a planetary roller screw shaft, linearly translatable between an extended position and a retracted position, connected to the jet engine nozzle,
    a nut, rotatable about the planetary roller screw shaft, and
    a plurality of rollers coupling the nut to the planetary roller screw shaft;
    a spur gear fixedly connected to the nut; and
    at least two motor assemblies, disposed on opposing sides of the planetary roller screw, coupled to the planetary roller screw nut, each motor assembly including:
    a variable reluctance machine having a variable reluctance machine output shaft,
    a planetary gear head, coupled to the a variable reluctance machine output shaft, having a planetary gear head output shaft, and
    a pinion gear, coupled to the spur gear, fixedly connected to the planetary gear head output shaft, and
    an electromagnetic actuator housing including a pair of trunions, disposed on opposing sides of the planetary roller screw, connected to respective bearings disposed on a jet engine body.

15. A system for controlling a geometry of a jet engine nozzle, comprising:
    a plurality of electromagnetic actuators, each electromagnetic actuator including:
    a planetary roller screw including a planetary roller screw shaft, linearly translatable between an extended position and a retracted position, connected to the jet engine nozzle, a nut rotatable about the shaft, and a plurality of rollers coupling the nut to the planetary roller screw shaft,
    a spur gear fixedly connected to the nut, and
    at least two motor assemblies, disposed on opposing sides of the planetary roller screw, coupled to the nut, each motor assembly including a DC motor having a DC motor output shaft, a planetary gear head, coupled to the DC motor output shaft, having a planetary gear head output shaft, and a pinion gear, coupled to the spur gear, fixedly connected to the planetary gear head output shaft, and
    an electromagnetic actuator housing including a pair of trunions, disposed on opposing sides of the planetary roller screw, connected to respective bearings disposed on a jet engine body; and
    a controller electrically coupled to the plurality of electromagnetic actuators.

16. The system according to claim 15, wherein each electromagnetic actuator housing includes:
    a rear housing enclosing the at least two motor assemblies;
    a bulkhead, connected to the rear housing and the planetary gear head of each motor assembly, including at least one bearing coupled to the nut;
    a front cover, connected to the rear housing, including the pair of trunions and a pair of thrust bearings coupled to the nut; and a planetary roller screw shaft enclosure, connected to the front cover, enclosing a portion of the planetary roller screw shaft.

17. The system according to claim 15, wherein each motor assembly includes a rotary position sensor coupled to the DC motor output shaft, the rotary position sensor being an eight speed resolver with four cycles per revolution.

18. The system according to claim 15, wherein each motor assembly includes a linear position sensor coupled to the planetary roller screw shaft, the linear position sensor being a linear variable differential transformer.

19. The system according to claim 15, wherein the DC motors are three phase brushless permanent magnet motors wired together in series by phase, and include Samarium Cobalt magnets and insulated stators.

20. The system according to claim 15, wherein a gear ratio between the spur gear and the pinion gears is 1.4:1, and a gear ratio for the planetary gear head is 5:1.

\* \* \* \* \*